United States Patent
Nagel et al.

(10) Patent No.: US 9,686,165 B2
(45) Date of Patent: Jun. 20, 2017

(54) SYSTEMS AND METHODS FOR INDICATING LINK QUALITY

(71) Applicant: Control4 Corporation, Salt Lake City, UT (US)

(72) Inventors: Paul Eugene Nagel, Salt Lake City, UT (US); Timothy Paul Spens, Salt Lake City, UT (US)

(73) Assignee: Control4 Corporation, Salt Lake City, UT (US)

( * ) Notice: Subject to any disclaimer, the term of this patent is extended or adjusted under 35 U.S.C. 154(b) by 584 days.

(21) Appl. No.: 13/870,386

(22) Filed: Apr. 25, 2013

(65) Prior Publication Data

US 2014/0321294 A1    Oct. 30, 2014

(51) Int. Cl.
H04W 4/00 (2009.01)
H04L 12/26 (2006.01)
H04L 12/24 (2006.01)

(52) U.S. Cl.
CPC .............. H04L 43/08 (2013.01); *H04L 41/22* (2013.01)

(58) Field of Classification Search
CPC .................................................. H04W 24/08
See application file for complete search history.

(56) References Cited

U.S. PATENT DOCUMENTS

| | | | | |
|---|---|---|---|---|
| 2004/0142699 A1* | 7/2004 | Jollota | ................ | H04W 16/14 455/452.2 |
| 2004/0224682 A1* | 11/2004 | Kang | ...................... | A23B 7/02 455/433 |
| 2006/0281415 A1* | 12/2006 | Koyanagi | ............. | H04W 24/04 455/67.11 |
| 2008/0175210 A1* | 7/2008 | Jamieson | ............... | H04W 24/10 370/338 |
| 2008/0183307 A1* | 7/2008 | Clayton | ............... | G05B 19/042 700/8 |
| 2009/0227201 A1* | 9/2009 | Imai | .................... | H04B 7/15557 455/7 |
| 2010/0214956 A1* | 8/2010 | Law | ....................... | H04L 12/14 370/255 |
| 2010/0232317 A1* | 9/2010 | Jing | .................... | H04L 12/2807 370/254 |
| 2010/0290386 A1* | 11/2010 | Cabral Hinojosa | ............ | H04B 7/15557 370/315 |
| 2012/0170481 A1* | 7/2012 | Kimura | ............. | H04B 7/15542 370/252 |

* cited by examiner

*Primary Examiner* — Kevin C Harper
(74) *Attorney, Agent, or Firm* — Austin & Rapp

(57) ABSTRACT

A method for indicating communication link quality by an electronic device is described. The method includes tracking local link quality information corresponding to a local receive link between the electronic device and a neighboring device. The method also includes receiving a request to indicate a link quality. The method further includes indicating the link quality.

18 Claims, 13 Drawing Sheets

| Key | | |
|---|---|---|
| ○ Green | ◌ Yellow | ◍ Red |

| Link Quality Status 1124 | Color Indication 1126 |
|---|---|
| RF Link Quality (LQI) = Good | ○ LED on |
| RF Link Quality (LQI) = Adequate | ◌ LED on |
| RF Link Quality (LQI) = Risk/Low | ◍ LED on |

FIG. 11

SYSTEMS AND METHODS FOR INDICATING LINK QUALITY

TECHNICAL FIELD

The present disclosure relates generally to electronic devices. More specifically, the present disclosure relates to systems and methods for indicating link quality.

BACKGROUND

In recent years, the price of electronic devices has decreased dramatically. In addition, the size of electronic devices has continued to decrease. Additionally, electronic devices continue to increase in capability and convenience.

Decreasing prices and increasing capabilities of electronic devices have permitted modern electronic devices to be conveniently used in homes and businesses. Many homes and businesses use electronic devices to manage everyday devices. For example, an electronic light switch may manage a light load (e.g., turn a light on and off). While these electronic devices may provide convenience, many also require control. The ever-increasing task of electronic device control may be a concern.

With more and more electronic devices being used in homes and businesses, improved control features are needed. As illustrated by this discussion, improved control of electronic devices may be beneficial.

BRIEF DESCRIPTION OF THE DRAWINGS

FIG. 11 is an example of displaying a link quality status on an electronic device.

DETAILED DESCRIPTION

Figure 1:
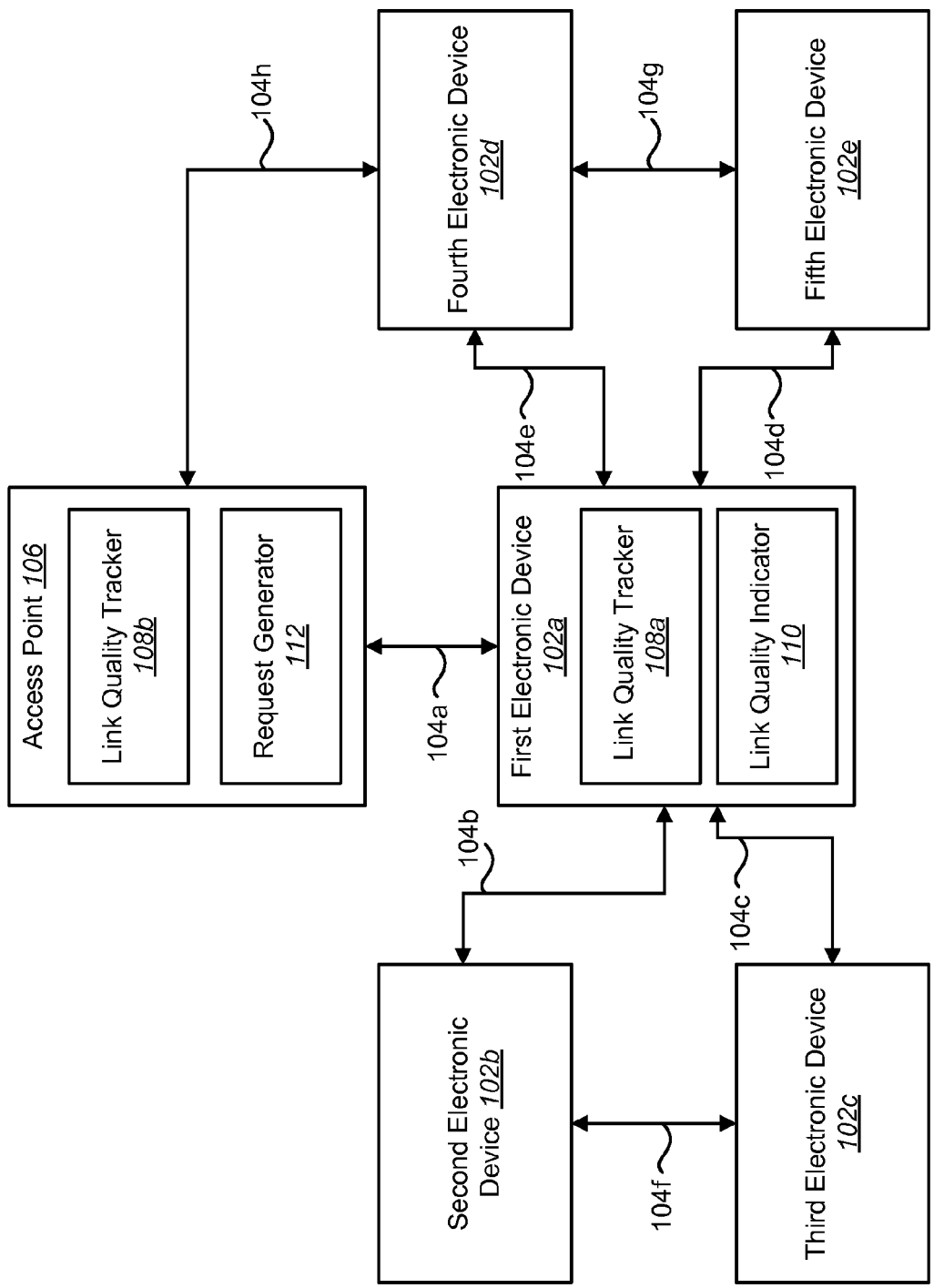
FIG. 1 is a block diagram of one configuration of an access point and electronic devices in which systems and methods for indicating link quality may be implemented.

A method for indicating link quality by an electronic device is described. The method includes tracking local link quality information corresponding to a local receive link between the electronic device and a neighboring device. The method also includes receiving a request to indicate a link quality. The method further includes indicating the link quality.

The local receive link may include a wireless link. The link quality may include local link quality. The link quality may include a lowest link quality based on an aggregate receive link and an aggregate transmit link between at least one electronic device and an access point.

The method may include converting the link quality information into a link quality status. The link quality status may be displayed via a display interface with a color indication corresponding to the link quality status.

The neighboring device may include an access point. The neighboring device may include another electronic device between the electronic device and an access point. The link quality information may comprise at least one of a received signal strength indicator (RSSI), a link quality indicator (LQI), a noise floor and a signal to noise ratio (SNR). The method may include updating the link quality information in real time.

A method for indicating link quality by an access point is described. The method includes gathering receive link quality information for at least one electronic device. The method also includes determining transmit link quality for at least one electronic device based on the gathered receive link quality information. The method further includes directing the electronic device to indicate a link quality.

At least one of the aggregate receive link and the aggregate transmit link may include wireless links. The link quality may include local link quality based on a local receive link between the electronic device and a neighboring device. The method may include determining which of the aggregate receive link and the aggregate transmit link has a lower link quality. The link quality may include a lower of aggregate receive link quality and aggregate transmit link quality. The link quality information may include at least one of a received signal strength indicator (RSSI), a link quality indicator (LQI), a noise floor and a signal to noise ratio (SNR). The link quality status may be displayed via a display interface with a color indication corresponding to the link quality status.

An electronic device for indicating link quality is described. The electronic device includes a processor. The electronic device also includes memory in electronic communication with the processor. Instructions stored in the memory are executable to track local link quality information corresponding to a local receive link between the electronic device and a neighboring device. The instructions are also executable to receive a request to indicate a link quality. The instructions are further executable to indicate the link quality.

Many homes and businesses may include multiple electronic devices that are connected to one another. The multiple electronic devices may also be connected to a home controller. The home controller may direct the electronic devices to supply power to (or remove power from) different loads. The home controller may send commands (e.g., messages, directions, requests and information) to the electronic devices. Accordingly, the systems and methods described herein may be implemented to ensure that the electronic devices are properly receiving (and transmitting) information from the home controller.

For example, in deployment of a number of wireless devices that may be communicating back to a common wireless access point (AP), the reliability of communications between each of the devices and the AP may not be easily determined. When there are ten or fewer wireless devices, it may be practical to individually inquire the wireless devices (through proprietary tools) to obtain signal reliability.

Current methods of determining wireless device signal strength may require proprietary tools to enquire values for certain parameters. Examples of parameters may include a received signal strength indicator (RSSI), a noise floor, a link quality indicator (LQI) and a signal-to-noise ratio (SNR). An example is given as follows. To understand a light switch communication reliability and communication reliability status, a user may need to connect to a home controller and then navigate to a network status page. Next, the user may select an electronic device, select the properties of the electronic device and then scan the output for the parameters (e.g., LQI, RSSI and other parameters). Then, a user may need to cross-reference the parameter values found to determine what a good parameter value is and what a bad parameter value is. This process may be repeated for each device. If there are hundreds of loads, this may take a long time. This method also does not translate the physical location of devices with communication issues. Accordingly, the systems and methods described herein may allow for an easy way to determine the wireless communication reliability status of hundreds of nodes (e.g., wireless devices).

Various configurations of the systems and methods disclosed herein are now described with reference to the figures, where like reference numbers may indicate functionally similar elements. The systems and methods as generally described and illustrated in the figures herein could be arranged and designed in a wide variety of different configurations. Thus, the following more detailed description of several configurations, as represented in the figures, is not intended to limit scope, as claimed, but is merely representative of the systems and methods.

FIG. 1 is a block diagram of one configuration of an access point 106 and electronic devices 102a-e in which systems and methods for indicating link quality may be implemented. While FIG. 1 depicts multiple electronic devices 102a-e, specific reference is made to a first electronic device 102a and a second electronic device 102b, for simplicity. However, it should be noted that multiple electronic devices 102 may be implemented in accordance with the systems and methods described herein.

In some implementations, an electronic device 102 may control one or more loads. For instance, an electronic device 102 may be an electronic light switch that controls one or more lighting loads (e.g., a lamp, outdoor lights, etc.). Other examples of electronic devices 102 may include an electronic thermostat (e.g., that may control heating loads), an electronic media controller (e.g., that may control media loads), a home security controller (e.g., that may control home security loads), etc. An electronic device 102 may control multiple types of loads. For example, an electronic device 102 may control lighting loads and heating loads. In some implementations, an electronic device 102 may be managed by another device. For example, a home controller may direct an electronic light switch (e.g., the electronic device 102) when to remove power from (or supply power to) a lighting load.

As depicted in FIG. 1, electronic devices 102 may communicate with other devices via links. Electronic devices 102a-e and the access point 106 may be in direct electronic communication with neighboring devices via local links 104a-h. For example, the first electronic device 102a may directly communicate with neighboring devices via local links 104a-e. The access point 106 may be a neighboring device of the first electronic device 102a on account of the local link 104a between the first electronic device 102a and the access point 106. Additionally or alternatively, other electronic devices 102b-e may be neighboring devices of the first electronic device 102a. For example, the second electronic device 102b may be a neighboring device of the first electronic device 102a on account of the local link 104b between the first electronic device 102a and the second electronic device 102b. Electronic communication between two neighboring devices may be either wired or wireless.

While FIG. 1 depicts the first electronic device 102a as communicating with multiple neighboring devices, one or more of the other electronic devices 102b-e may also communicate with multiple neighboring devices. In other words, the systems and methods described herein may be implemented in a mesh network, as described in connection with FIG. 10. Similarly, the access point 106 may communicate with multiple neighboring devices as described in connection with FIG. 10.

It should be noted that a neighboring device of one electronic device may not be a neighboring device of a different electronic device. For example, while the access point 106 may be a neighboring device of the first electronic device 102a, the access point 106 may not be a neighboring device of the second electronic device 102b. In FIG. 1, this is indicated by the lack of a local link 104 between the second electronic device 102b and the access point 106. In this example, the second electronic device 102b may be in communication with the access point 106 via an aggregate route. An aggregate route may refer to an indirect route between two points on a network. The aggregate route may include aggregate links that indicate directions of communication. For example, an aggregate route may include an aggregate receive link and an aggregate transmit link. An aggregate link may include multiple local links 104. For example, an aggregate route between the second electronic device 102b and the access point 106 may include a local link 104b between the second electronic device 102b and the first electronic device 102a and a local link 104a between the first electronic device 102a and the access point 106.

The first electronic device 102a may receive/transmit information via the links 104a-e. As used herein, a receive link may refer to a communication link terminating at an electronic device 102. By comparison, a transmit link may refer to a communication link terminating at the access point 106.

For example, the first electronic device 102a may receive load control information from the access point 106. An example of load control information may include a message directing the first electronic device 102a to remove power from a lighting load. Via the links, the first electronic device 102a may also receive/transmit electronic device control information. An example of electronic device control information may include link quality information.

The local links 104a-h may be wireless or wired. Accordingly, the generic use of the systems and methods described herein may be used in many applications, both wired and wireless. However, due to the dynamic nature of the network, wireless links are more likely.

The first electronic device 102a may include a link quality tracker 108a and a link quality indicator 110. The other electronic devices 102b-e may also include link quality trackers, link quality indicators and other elements that may be included in the first electronic device 102a. The elements contained in the first electronic device 102a (such as the link quality tracker 108a and the link quality indicator 110) may be implemented in hardware, software, firmware or any combination thereof.

The link quality tracker 108a may track link quality information. The link quality information may include a communication reliability of a link, a signal strength of a signal transmitted (and received) via a link and/or any other information indicative of the quality of a link. In some implementations, the link quality information may be a metric, a value, a measurement or any other quantitative data. For example, the link quality information may include one or more of a receive signal strength indicator (RSSI), a link quality indicator (LQI), a noise floor and a signal to noise ratio (SNR).

The link quality tracker 108a may track link quality information corresponding to a local link 104 between the first electronic device 102a and a neighboring device. For example, the first electronic device 102a may track signal characteristics (e.g., the link quality information), as seen by the first electronic device 102a with respect to a neighboring device. In other words, the first electronic device 102a may track link quality corresponding to its local links 104a-e. In some implementations, the tracked link quality information may correspond to one direction of communication. For example, the link quality tracker 108a may track link quality information corresponding to a receive link. Optionally, the first electronic device 102a may store the tracked link quality information to memory within (or coupled to) the first electronic device 102a. The first electronic device 102a may then retrieve the tracked link quality information when needed.

The link quality indicator 110 may indicate link quality. For example, the link quality indicator 110 may display link quality that corresponds to a local link 104 between the first electronic device 102a and a neighboring device. Additionally or alternatively, the link quality indicator 110 may display a worst case link quality along an aggregate route between the access point 106 and the first electronic device 102a. The worst case link quality may be based on one or more aggregate links (e.g., an aggregate receive link and an aggregate transmit link) between the first electronic device 102a and the access point 106.

An example of displaying worst case link quality is given as follows. The second electronic device 102b may be in communication with the access point 106 (e.g., a controller) via one or more intermediate devices between the second electronic device 102b and the access point 106. In other words, the second electronic device 102b may transmit information to the access point 106 via an aggregate transmit link and may receive information from the access point 106 via an aggregate receive link. Worst case link quality information may be the link quality information corresponding to the aggregate link that has the lowest link quality. Accordingly, a link quality indicator (not shown) of the second electronic device 102b may display the worst case (e.g., the lowest) link quality. More detail describing how to determine which of the aggregate links has a lower link quality is given below.

In some implementations, the link quality indicator 110 may indicate link quality based on a request. For example, the request may direct the first electronic device 102a to enter a particular mode of operation. In this mode of operation, the first electronic device 102a may be configured to display the link quality.

The link quality indicator 110 may indicate the link quality by indicating a link quality status. The link quality status may be a qualitative representation of the quantitative link quality information. For example, the link quality status may indicate that the quality of a link is "good." Other examples of link quality statuses include "adequate" or "risk/low." As will be described below, displaying the link quality status may include converting the link quality information into a link quality status.

The link quality indicator 110 may be a display interface that may be configured to display one or more color indications that may be associated with one or more link quality statuses. For example, a green color indication may be associated with a "good" link quality status. By comparison, a yellow color indication may be associated with an "adequate" link quality status and a red color indication may be associated with a "risk/low" link quality status. Accordingly, the link quality indicator 110 may display the color indication associated with the link quality status. In some implementations, the link quality indicator 110 may be referred to as a signal indicator, a status indicator and/or a local indicator, etc.

The link quality indicator 110 may help users identify areas within a building with weak communications. This may allow the user to add a repeater or access point to that area to improve communications for all nodes in this area. Once installed, the link quality indicators 110 of multiple electronic devices 102 in that area may indicate an improved communication link status.

The systems and methods described herein may provide a very easy way to inform users how to optimize a wireless communication network. For example, a user may not have to cross-reference quantitative values (e.g., the RSSI, the LQI, the noise floor and the SNR) to determine whether a link quality is "good," "adequate" or "risk/low." Rather, the user may simply take note of the color indication and associate the color indication with a particular link quality status. In some implementations, the link quality indicator 110 may blink (in a color indication associated with the link quality status) while the first electronic device 102a is joining a network, or during a reboot process.

An example highlighting the benefits of displaying the link quality status is given as follows. The link quality indicator 110 may be displayed when a show signal strength indicator option is checked in a control program. In this case, all electronic devices may indicate their link quality status via their respective link quality indicators 110. This option (e.g., the show signal strength indicator option) may have an activity timer. In this mode (e.g., the activity timer is active), a user may walk through a home and may see radio frequency (RF) communication "risk" areas. This may indicate to the user where a communication network may be reinforced with a repeater or another access point.

The access point 106 may be a device that controls one or more of the electronic devices 102a-e. For example, the access point 106 may be a home controller that directs one or more electronic light switches when to remove power from (or supply power to) one or more lighting loads. The access point 106 may control different types of electronic devices 102a-e, such as electronic light switches, electronic thermostats, electronic media controllers and electronic home security controllers. The access point 106 may include a link quality tracker 108b and a request generator 112. It should be noted that the elements contained in the access point 106 may be implemented in hardware, software, firmware or any combination thereof.

The link quality tracker 108b may track link quality information. For example, the link quality tracker 108b may track link quality information corresponding to a link between the access point 106 and one or more electronic devices 102a-e. The link quality tracker 108b may track link quality information corresponding to a local link 104 between the access point 106 and a neighboring device. In other words, the link quality tracker 108b may track local link quality information. Additionally, the link quality tracker 108b may track link quality information corresponding to an aggregate link between the access point 106 and a non-neighboring device. In other words, the link quality tracker 108b may track aggregate link quality information.

The link quality tracker 108b may track link quality information corresponding to a transmit link from an electronic device 102 back to the access point 106 (e.g., a home controller), with respect to one or more neighboring devices. For example, there may be multiple intermediate hops (e.g., electronic devices) on a route from the second electronic device 102b to the access point 106. Similarly, the link quality tracker 108b may track link quality information corresponding to a receive link from the access point 106 to an electronic device 102.

The access point 106 may gather link quality information. For example, the access point 106 may gather receive link quality information from the second electronic device 102b. The access point 106 may gather the information (e.g., the local link quality information) either passively or actively.

The access point 106 may generate aggregate transmit and receive link quality information based on the local link quality information. For example, the access point 106 may combine link quality information corresponding to one or more local links 104 to generate aggregate link quality information. With these two pieces of link quality information (e.g., aggregate receive link quality information and aggregate transmit link quality information), the access point 106 may provide bi-directional link characteristics between any two points in the network.

The request generator 112 may send a request to display the link quality to the first electronic device 102a. The request may be sent to all electronic devices 102a-e on a wireless network. The request may direct the first electronic device 102a to indicate the link quality using the link quality indicator 110. In this example, the local link quality may be displayed on the first electronic device 102a (e.g., the electronic device that receives information from neighboring devices).

The request may direct the first electronic device 102a to display the lowest (e.g., the worst case) link quality from a set of links. As will be described below, directing the first electronic device 102a to display the worst case link quality may include determining the worst case link quality information and sending the first electronic device 102a the worst case link quality information. As described above, the request may direct the first electronic device 102a to enter a particular mode of operation.

Figure 2:
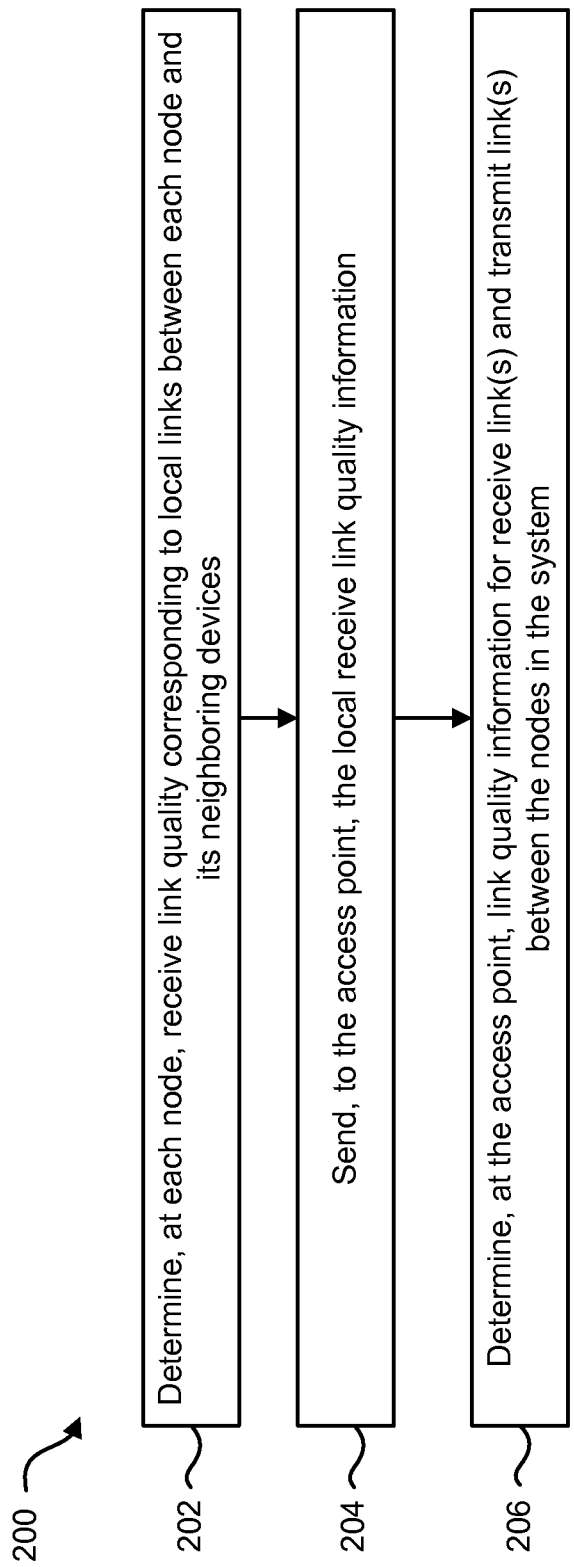
FIG. 2 is a flow diagram illustrating one configuration of a method for indicating link quality by nodes in a system.

FIG. 2 is a flow diagram illustrating one configuration of a method 200 for indicating link quality by nodes in a system. As used herein, the term "node" may refer to an electronic device 102 or an access point 106. Each node in a system may determine 202 receive link quality corresponding to local links 104 between the node and the neighboring devices of that node. For example, the access point 106 may determine 202 receive link quality corresponding to a local link 104a shared with the first electronic device 102a and also may determine 202 receive link quality corresponding to a local link 104h shared with the fourth electronic device 102d. In a similar fashion, the third electronic device 102c may determine 202 link quality corresponding to a local link 104f shared with the second electronic device 102b and may determine 202 receive link quality corresponding to a local link 104c shared with the first electronic device 102a. The other nodes may also determine 202 receive link quality corresponding to their respective local links 104.

The nodes may then send 204 their respective local receive link quality information to the access point 106. For example, the first electronic device 102a may send 204 link quality information corresponding to its local links 104a-e to the access point 106.

After receiving the local receive link quality information, the access point 106 may determine 206 link quality information for transmit link(s) and receive link(s) between the nodes in the system. Determining 206 link quality information may include determining aggregate transmit link quality information and aggregate receive link quality information. Determining an aggregate link quality may include combining the local receive link quality information of the local links 104 that make up the aggregate link. For example, the second electronic device 102b may be in communication with the access point 106 via an aggregate link that consists of two local links 104a, 104b. In this example, the aggregate link quality may be the link qualities of the local links 104a-b in this route. The access point 106 may determine 206 the link quality information for aggregate links to/from each node (e.g., electronic device 102 and the access point 106) in a system. Accordingly, the access point 106 may provide bi-directional link characteristics between any two points in the network. This will be described in greater detail below.

After determining 206 link quality information for aggregate link(s), the nodes may indicate link quality as will be described in connection with FIGS. 2A and 3. For example, the access point 106 may send a request to indicate the link quality and the electronic devices 102a-e may indicate the link quality.

Figure 2A:
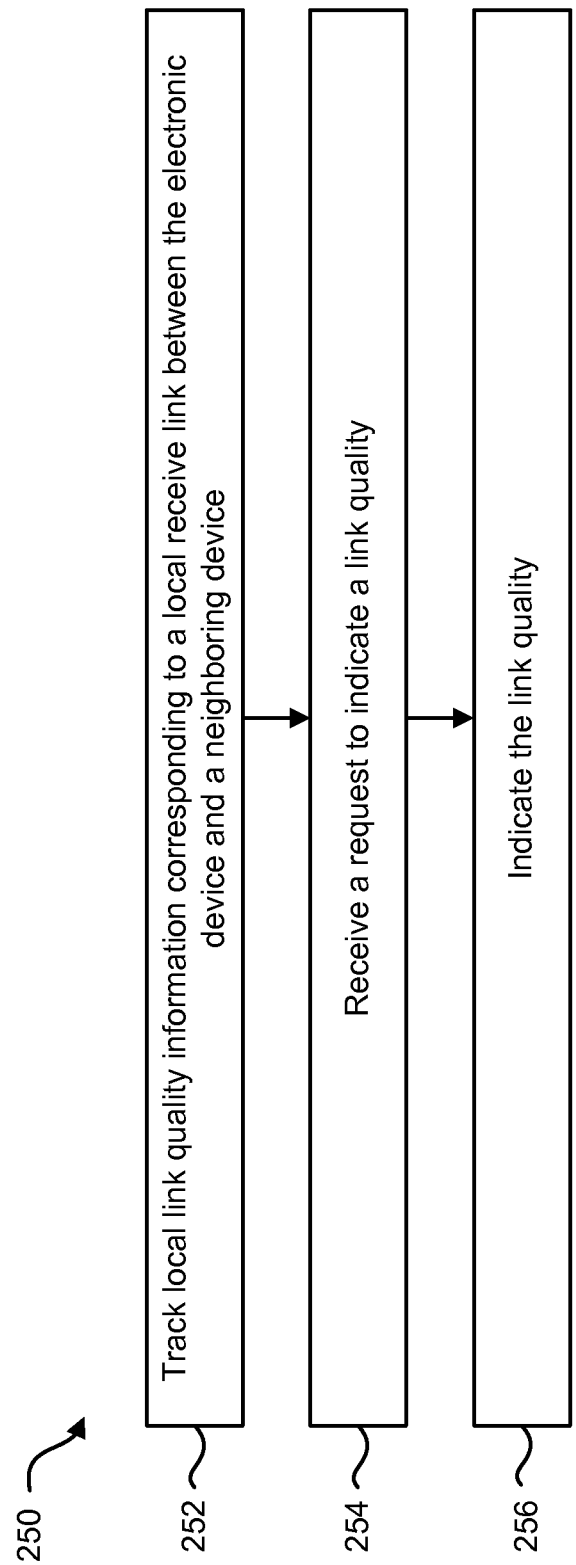
FIG. 2A is a flow diagram illustrating one configuration of a method for indicating link quality by an electronic device.

FIG. 2A is a flow diagram illustrating one configuration of a method 250 for indicating link quality by an electronic device 102. The method 250 may be performed by a single electronic device 102 as part of implementing the method 200 of FIG. 2. Any of the electronic devices 102a-e may perform the method 250.

For example, the first electronic device 102a may track 252 local link quality information corresponding to a local receive link between the first electronic device 102a and a neighboring device. As described above, the first electronic device 102a may receive information from a neighboring device via local link(s) 104a-e. In this implementation, the first electronic device 102a may track 252 link quality information that corresponds to at least one of these local receive links.

The first electronic device 102a may receive 254 a request to indicate link quality information corresponding to a local link 104 between the first electronic device 102a and a neighboring device. The first electronic device 102a may also receive 254 a request to indicate worst case link quality information. As described above, a worst case link quality may be the link quality of whichever of the aggregate transmit link and the aggregate receive link is the "worst case link." As used herein, the term "worst case link" may refer to a link (of a set of links) with the lowest link quality. In some implementations, receiving 254 a request to indicate a worst case link quality may include receiving link quality information. For example, the access point 106 may determine a worst case link and send the worst case link quality information to the electronic device 102.

Receiving 254 a request to indicate a link quality may include receiving a request to enter a particular mode of operation in which the first electronic device 102a may be configured to display the link quality. Receiving 254 a request to display a link quality may also include receiving a message directing the first electronic device 102a to display the link quality.

The first electronic device 102a may indicate 256 the link quality. Indicating 256 the link quality may include indicating 256 the link quality corresponding to a local link 104a-e between the first electronic device 102a and a neighboring device. Indicating 206 the link quality may also include indicating 256 a worst case link quality.

In some implementations, the first electronic device 102a may indicate 256 the link quality by displaying a link quality status. As described above, a link quality status may be a qualitative indication of the link quality. For example, a link quality status may indicate that a link quality is "good," "adequate," or "risk/low." Indicating 256 the link quality status may include displaying a color indication that corresponds to the link quality status of the link. For example, the link quality indicator 110 may display a green color indication if the link quality status is "good." Similarly, the link quality indicator 110 may display a yellow color indication or a red color indication if the link quality status is "adequate" or "risk/low," respectively.

The link quality indicator 110 may indicate 256 a worst case link quality. For example, if an aggregate receive link has a link quality status of "adequate" and an aggregate transmit link has a link quality status of "risk/low," the first electronic device 102a may display a red color indication that may correspond to the "risk/low" link quality status of the aggregate transmit link.

Figure 3:
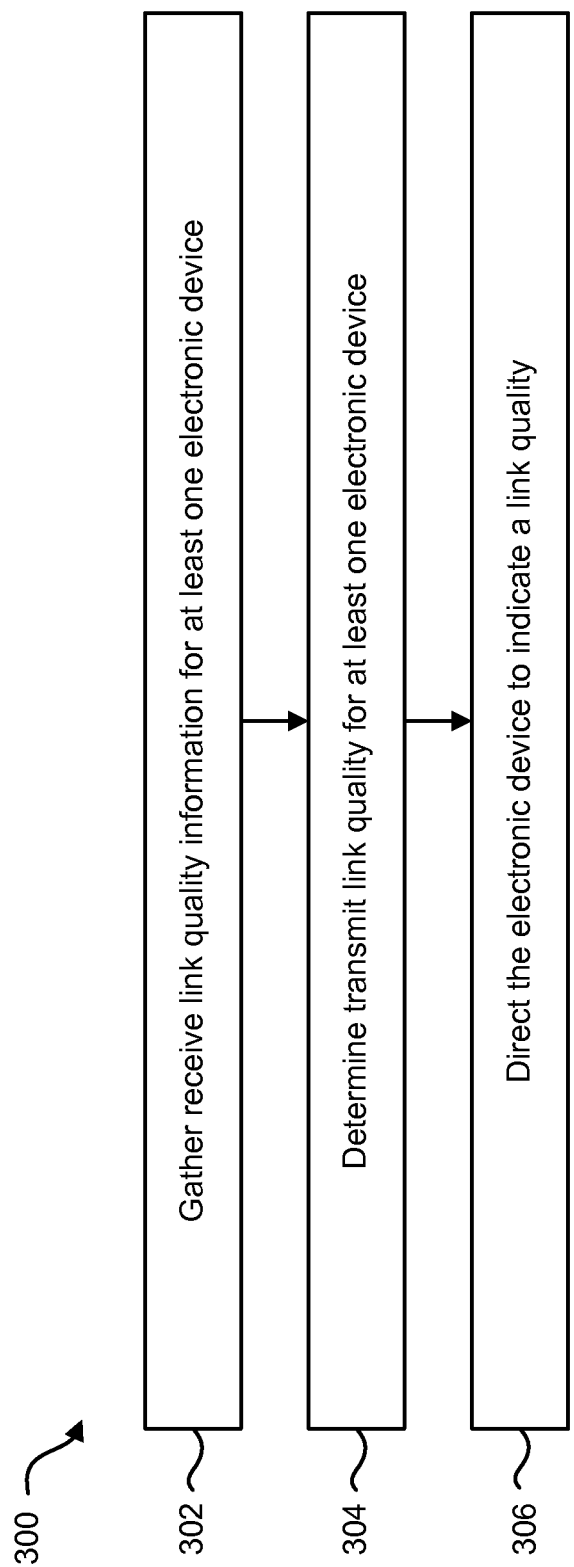
FIG. 3 is a flow diagram illustrating one configuration of a method for indicating link quality by an access point.

FIG. 3 is a flow diagram illustrating one configuration of a method 300 for indicating link quality by an access point 106. The method 300 of FIG. 3 may be performed by an access point 106 as part of implementing the method 200 of FIG. 2.

The access point 106 may gather 302 receive link quality information for at least one electronic device 102. The access point 106 may gather 302 receive link quality information for each electronic device 102a-e in a system. Gathering 302 receive link quality information may include gathering link quality information for a local link. For example, referring to FIG. 1, the access point 106 may gather local link quality information from the fourth electronic device 102d (e.g., corresponding to a local receive link 104h).

Gathering 302 receive link quality information may also include gathering receive link quality information for an aggregate receive link. For example, referring to FIG. 1, the access point 106 may gather 302 aggregate receive link quality information corresponding to the aggregate link to the second electronic device 102b. More specifically, the access point 106 may gather local link quality information from the second electronic device 102b (e.g., corresponding to a local receive link 104b). Similarly, the access point 106 may gather local link quality information from the first electronic device 102a (e.g., corresponding to the local receive link 104a). In this example, the access point 106 may gather 302 aggregate receive link quality information based on the link quality information of the local links 104a-b. The access point 106 may also gather 302 receive link quality for a local link between electronic devices 102. For example, the access point 106 may gather 302 receive link quality information for a local link 104g between the fourth electronic device 102d and the fifth electronic device 102e.

The access point 106 may determine 304 transmit link quality for at least one electronic device 102. Determining 304 transmit link quality may be based on the gathered receive link quality information. For example, the access point 106 may gather 302 receive link quality information from at least one electronic device 102. The access point 106 may then use the receive link quality information to determine the transmit link quality. Determining 304 transmit link quality may include determining link quality for an aggregate transmit link or a local transmit link.

The access point 106 may determine 304 transmit link quality information for each electronic device 102a-e in a system. In other words, the access point 106 may gather 302 receive link quality information from all electronic devices 102 in a system, and may use that information to determine the link quality for transmit links from each electronic device 102 in the system. Accordingly, the access point 106 may have quality link information corresponding to any local link 104 (or combination of local links 104) in the system.

The access point 106 may direct 306 the electronic device 102 to indicate a link quality. In some examples, the access point 106 may direct 306 an electronic device 102 to indicate link quality corresponding to a local link 104a-h. For example, the access point 106 may direct 306 the first electronic device 102a to display link quality corresponding to a local link 104a between the first electronic device 102a and the access point 106.

The access point 106 may also direct 306 an electronic device 102 to indicate a worst case link quality. For example, the access point 106 may direct 306 the second electronic device 102b to display link quality information corresponding to the "worst" of an aggregate receive link and an aggregate transmit link between the second electronic device 102b and the access point 106. Directing 306 an electronic device 102 to display a worst case link quality may include determining which of multiple links is the "worst," as will be described below.

In some implementations, the access point 106 may send link quality information to an electronic device 102. For example, as described above, the first electronic device 102a may track local link quality information and store the local link quality information to memory. Additionally, the first electronic device 102a may not track one or more of aggregate receive link quality information, aggregate transmit link quality information and local transmit link quality information. Accordingly, the access point 106 may send this link quality information to the first electronic device 102a.

Directing 306 the electronic device 102 to indicate a link quality may include directing the electronic device 102 to enter a particular mode of operation in which an electronic device 102 may be configured to display the link quality. In this mode of operation, a user may easily identify electronic devices 102 with communication issues.

Figure 4:
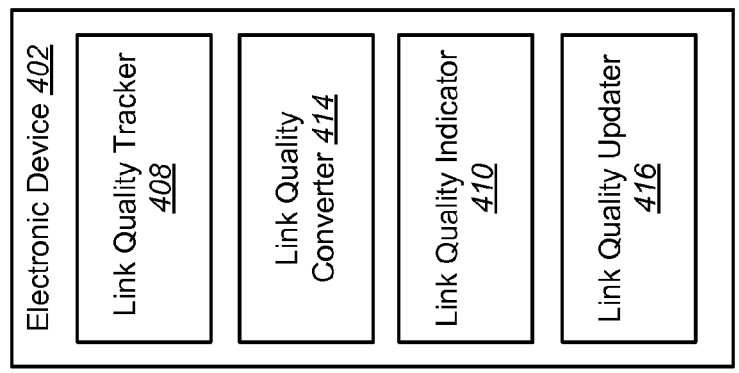
FIG. 4 is a block diagram of a more specific configuration of an electronic device in which systems and methods for indicating link quality may be implemented.

FIG. 4 is a block diagram of a more specific configuration of an electronic device 402 in which systems and methods for indicating link quality may be implemented. The electronic device 402 may be an example of the electronic devices 102a-e described in connection with FIG. 1. In other words, the electronic device 402 may or may not be in direct communication with the access point 106 via a local link 104. The electronic device 402 may include a link quality tracker 408 and a link quality indicator 410 that may be examples of corresponding elements described in connection with FIG. 1. Additionally, the electronic device 402 may include a link quality converter 414 and a link quality updater 416.

The link quality converter 414 may convert the link quality information into a link quality status. As described above, the link quality information may be a quantitative value. For example, the link quality information may be a metric, a value and/or a measurement of the quality of a link. By comparison, the link quality status may be a qualitative representation of the link quality. For example, the link quality status may indicate that a link is "good," "adequate" or "risk/low." Accordingly, the link quality converter 414 may convert quantitative data into qualitative data. The electronic device 402 may include algorithms, lookup tables, formulas, etc., that allow the link quality converter 414 to convert the link quality information into a link quality status.

Converting the link quality information into (and displaying) a link quality status may be beneficial as it provides a simple and efficient way to determine the quality of a link. For example, implementing the systems and methods described herein, a user may not need to be familiar with the value of the quantitative link quality information. Under current methods, a user may need to be familiar with the quantitative link quality information to determine whether the link quality is "good," "adequate" or "risk/low," or a user may need to cross-reference the quantitative values to determine a link quality status. By comparison, under the systems and methods described herein, the user may determine the quality of a link by simply taking note of a color indication and associating the color indication with the link quality status.

The link quality updater 416 may update link quality information in real time. For example, the electronic device 402 may receive a ping (e.g., a round robin ping) from an access point 106 (e.g., a director or other driver/agent). The round robin ping may capture latency and failure counts. In some implementations, the electronic device 402 may receive the ping during a particular mode of operation, for example while a show signal strength indicator option is enabled. Then, the electronic device 402 may determine (and indicate) the link quality based on the round robin ping. In some implementations, the link quality may only be updated during incoming messages to the electronic device 402. However, in other implementations, the link quality updater 416 may update the link quality in real time (e.g., to reflect an increased interference).

An example is given as follows. While a show signal strength indicators option is enabled, a user may turn on one or more devices that may cause interference. The link quality updater 416 may then update the link quality based on the presence of these devices and any interference caused by these devices. For example, the link quality updater 416 may change the link quality status from "good" to "adequate" to reflect an increased amount of interference. Accordingly, the link quality indicator 410 may change the color indication (e.g., from green to yellow) to indicate the updated link quality status. Examples of devices that may cause interference include an Institute of Electrical and Electronics Engineers (IEEE) 802.11 (Wireless Fidelity or "Wi-Fi") device, a microwave, a cordless phone, a baby monitor, and any other 2.4 gigahertz (GHz) devices.

Figure 5:
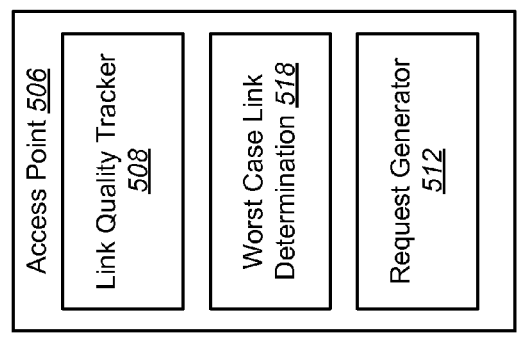
FIG. 5 is a block diagram of a more specific configuration of an access point in which systems and methods for indicating link quality may be implemented.

FIG. 5 is a block diagram of a more specific configuration of an access point 506 in which systems and methods for indicating link quality may be implemented. The access point 506 may be an example of the access point 106 described in connection with FIG. 1. The access point 506 may include a link quality tracker 508 and a request generator 512 that may be examples of corresponding elements described in connection with FIG. 1. The access point 506 may also include a worst case link determination module 518.

The worst case link determination module 518 may determine a worst case link. For example, the worst case link determination module 518 may determine which of an aggregate receive link and an aggregate transmit link is the worst case link. An example is given as follows. As described above, the access point 506 may obtain link quality information for an aggregate receive link and for an aggregate transmit link. In some implementations, the access point 506 may include circuitry that determines an aggregate link quality. For example, the access point 506 may include circuitry that may combine and/or weight local link quality information to obtain the aggregate link quality information. An example is given as follows. The second electronic device 102b may be in communication with the access point via an aggregate link that consists of a local link 104b and a local link 104a. In this example, the aggregate link quality may be the link qualities of the local links 104a-b in this route.

The worst case link determination module 518 may compare the link quality information and determine which link has the lowest link quality. The worst case link determination module 518 may then identify the link with the lowest link quality as the worst case link. Then as described above, the access point 506 may send the worst case link quality information (and a request to display the worst case link quality) to the first electronic device 102a.

Figure 6:
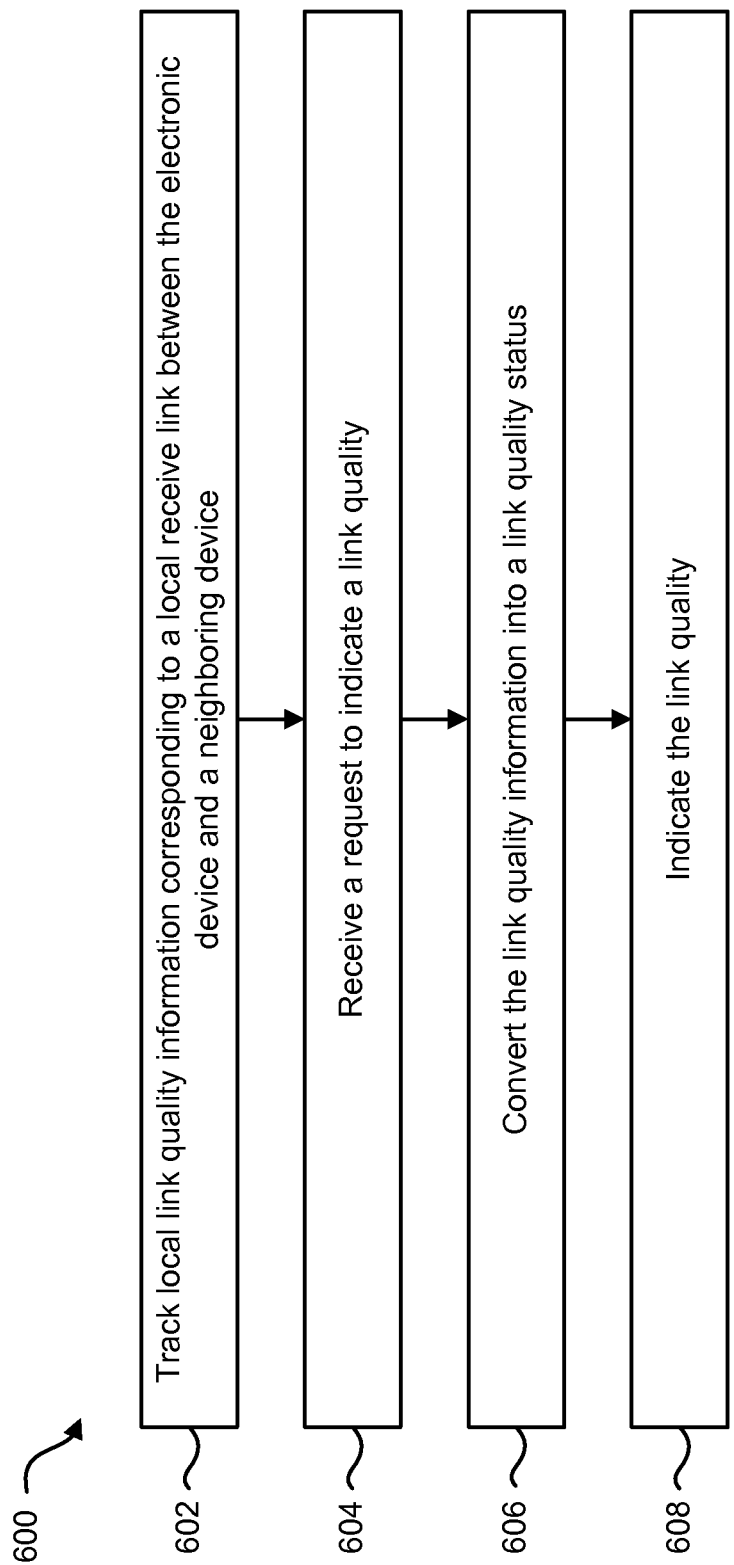
FIG. 6 is a flow diagram illustrating a more specific configuration of a method for indicating link quality by an electronic device.

FIG. 6 is a flow diagram illustrating a more specific configuration of a method 600 for indicating link quality by an electronic device 402. The electronic device 402 may track 602 local link quality information corresponding to a local receive link between the electronic device 402 and a neighboring device. This may be performed as described in connection with FIG. 2.

The electronic device 402 may receive 604 a request to indicate a link quality. This may be performed as described in connection with FIG. 2.

The electronic device 402 may convert 606 the link quality information into a link quality status. As described above, the link quality information may include quantitative data that may indicate the quality of a link. By comparison, the link quality status may be a qualitative representation of the quality of a link. Accordingly, the electronic device 402 may convert 606 quantitative data (e.g., the link quality information) into qualitative data (e.g., the link quality status). The electronic device 402 may include (or be coupled to) a lookup table. The electronic device 402 may use the lookup table to determine whether a particular link quality information value is "good," "adequate" or "risk/low."

The electronic device 402 may indicate 608 the link quality. This may be performed as described in connection with FIG. 2. For example, the electronic device 402 may display a color indication that corresponds to the link quality status.

In some implementations, the electronic device 402 may indicate the location of the electronic device 402. As described above, the link quality indicator 410 may include a display interface that illuminates in a color associated with the link quality status of a link. The same display interface may indicate the location of the electronic device 402. An example is given as follows. During a particular mode of operation, the link quality indicator 410 may illuminate red to indicate a "risk/low" link quality status. A user, walking through a building, may identify the electronic device 402 via the red indication of the link quality indicator 410. This may be beneficial as the user may easily identify the location of an electronic device 402 with communication issues. Accordingly, under the systems and methods described herein, a user may simply take note of a visual cue to identify the location of the electronic device 402.

Figure 7:
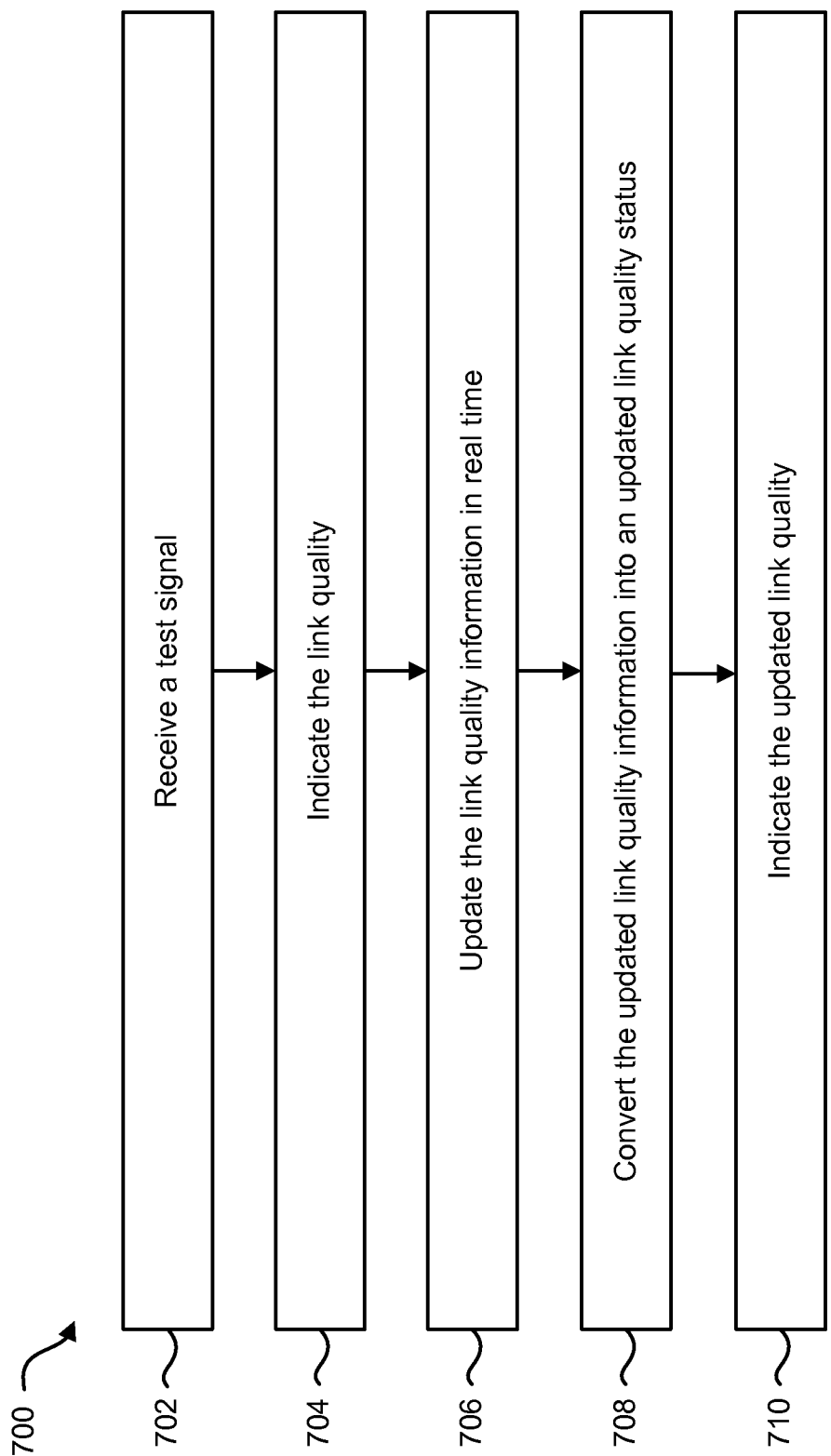
FIG. 7 is a flow diagram illustrating one configuration of a method for updating link quality information by an electronic device.

FIG. 7 is a flow diagram illustrating one configuration of a method 700 for updating link quality information by an electronic device 402. The method 700 may be used to identify sources of interference in real time. A user may implement the method 700 to determine the interference caused by multiple devices, either individually or in combination. For example, the user may sequentially turn on different devices to determine which devices are causing interference, and to what degree. The electronic device 402 may receive 702 a test signal. For example, the electronic device 402 may receive a round robin ping from an access point 106 (or other driver/agent). In some implementations, the electronic device 402 may receive 702 the test signal during a particular mode of operation. For example, the electronic device 402 may enter a particular mode of operation (e.g., a show signal strength indicators mode) based on a request from the access point 106. In this mode of operation, the electronic device 402 may be configured to receive 702 the test signal.

The electronic device 402 may indicate 704 the link quality. This may be performed as described in connection with FIG. 2.

The electronic device 402 may update 706 the link quality information in real time. As described above, other devices (e.g., 2.4 GHz devices such as microwaves, cordless phones, baby monitors, etc.) may cause interference and reduce link quality. Updating 706 the link quality information in real time may allow a user to easily identify devices that cause interference and how much interference the devices cause. For example, during a particular mode of operation in which the electronic device 402 may be configured to display link quality status, a user may turn on one or more devices that may cause interference. The electronic device 402 may update 706 the link quality information based on the interference caused by the devices. Updating 706 the link quality information in real time may be beneficial as it allows a user to quickly determine interference from one or more devices.

The electronic device 402 may then convert 708 the updated link quality information into an updated link quality status. This may be performed as described in connection with FIG. 6. For example, the electronic device 402 may convert 708 the quantitative updated link quality information into a qualitative updated link quality status.

The electronic device 402 may then indicate 710 the updated link quality. This may be performed as described in connection with FIG. 1. For example, the electronic device 402 may display a color indication via a link quality indicator 110 that corresponds to the updated quality link status. Indicating 710 the updated link quality may include changing the color indication of the link quality indicator 110. For example, if the original link quality status was "good" and the updated link quality status is "adequate," the link quality indicator 110 may change the color indication from green to yellow.

Figure 8:
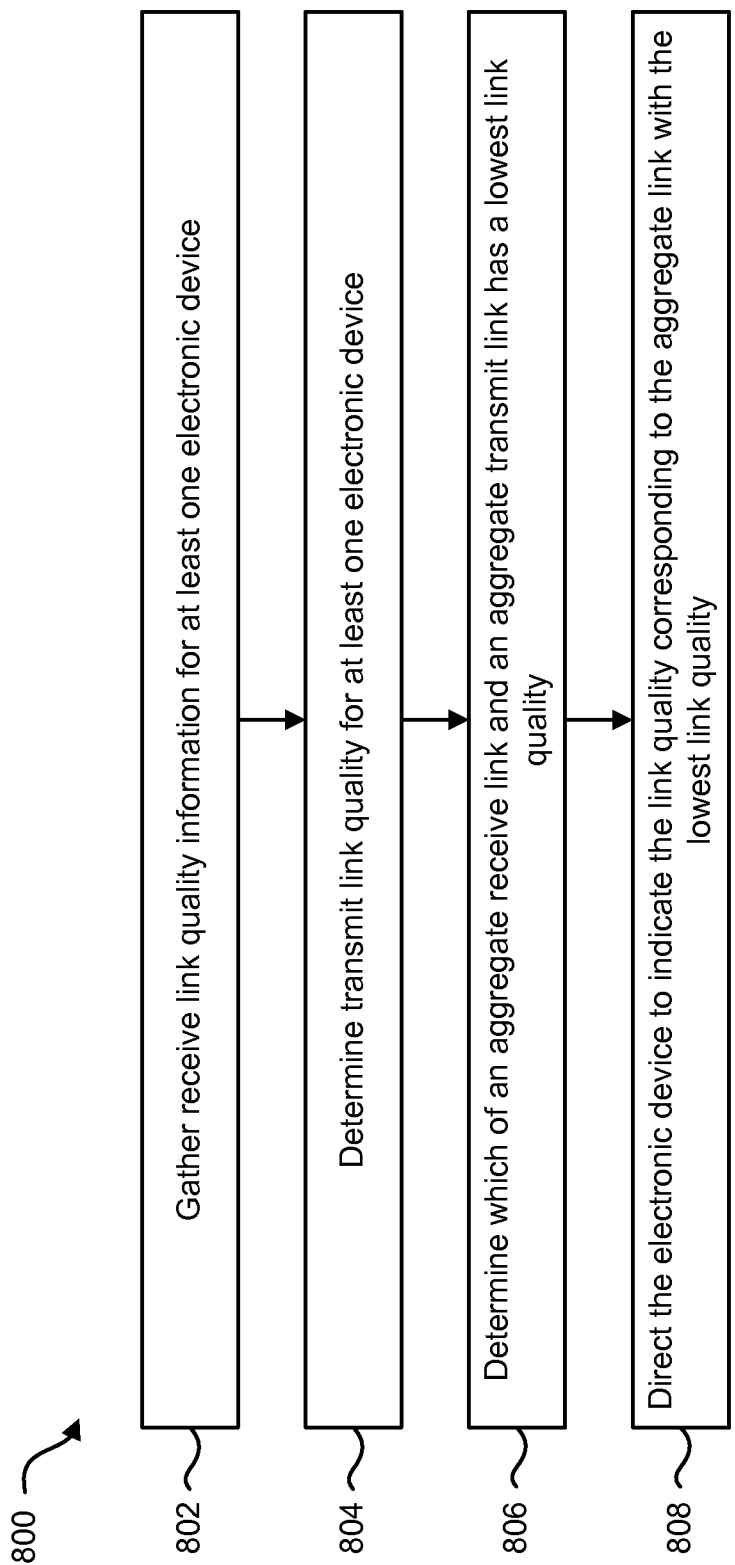
FIG. 8 is a flow diagram illustrating a more specific configuration of a method for indicating link quality by an access point.

FIG. 8 is a flow diagram illustrating a more specific configuration of a method 800 for indicating link quality by an access point 506. The access point 506 may gather 802 receive link quality information for at least one electronic device 102. This may be performed as described in connection with FIG. 3.

The access point 506 may determine 804 transmit link quality for at least one electronic device 102 based on the gathered receive link quality information. This may be performed as described in connection with FIG. 3.

The access point 506 may determine 806 which of an aggregate receive link and an aggregate transmit link has a lowest link quality. In other words, the access point 506 may determine 806 which of the aggregate receive link and the aggregate transmit link is a worst case link. Determining 806 which of the aggregate receive link and the aggregate transmit link is a worst case link may include comparing the aggregate receive link quality information and the aggregate transmit link quality information and determining which has the lowest link quality. The link with the lowest link quality may be identified as the worst case link.

The access point 506 may direct 808 the electronic device 102 to indicate the link quality corresponding to the aggregate link with the lowest link quality. In other words, the access point 506 may direct 808 the electronic device 102 to display the worst case link quality. As described above, directing 808 the electronic device 102 to display the worst case link quality may include directing the electronic device to enter a particular mode of operation in which the electronic device 102 may be configured to display the worst case link quality.

As described above, directing 808 the electronic device 102 to display the worst case link quality may include sending the worst case link quality information. The electronic device 102 may then convert the worst case link quality information to a worst case link quality status as described in connection with FIG. 6 and may display the worst case link quality status as described in connection with FIG. 1.

Figure 9:
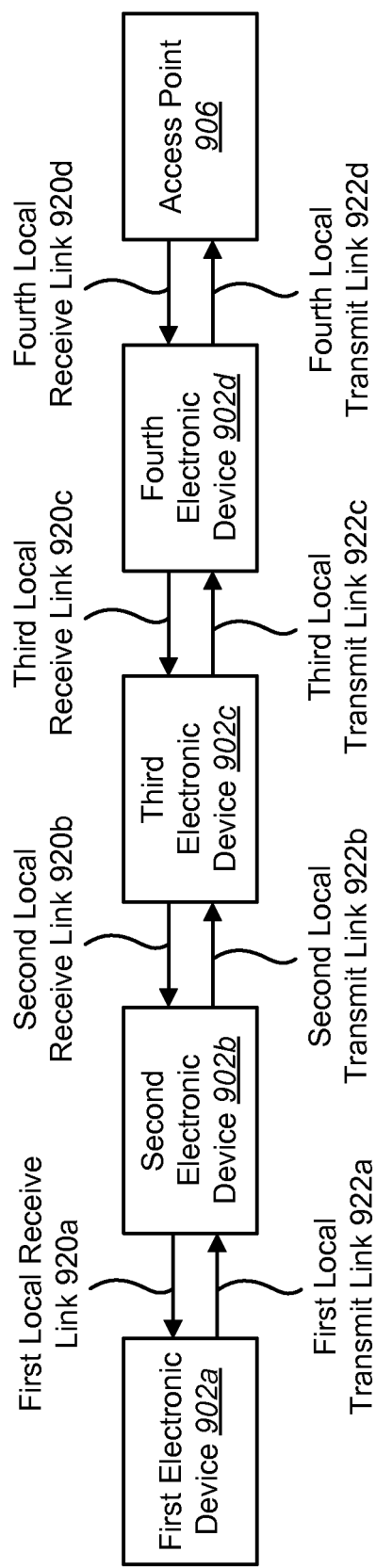
FIG. 9 is a block diagram illustrating one configuration of aggregate links according to the systems and methods described herein.

FIG. 9 is a block diagram illustrating one configuration of aggregate links according to the systems and methods described herein. The electronic devices 902*a-d* and the access point 906 may be examples of corresponding elements described in connection with FIG. 1.

As described above, electronic devices 902*a-d* and the access point 906 may be in direct communication with neighboring devices via one or more local links. For example, the first electronic device 902*a* may be in direct communication with the second electronic device 902*b* via a local link. Each local link may include links corresponding to different directions of communication. For example, the first electronic device 902*a* may receive information from the second electronic device 902*b* via a first local receive link 920*a*. Similarly, the first electronic device 902*a* may send information to the second electronic device 902*b* via a first local transmit link 922*a*. The other electronic devices 902*b-d* and the access point 906 may be connected in a similar fashion via one or more local receive links 920*b-d* and one or more local transmit links 922*b-d*.

By comparison, the electronic devices 902*a-d* and the access point 906 may be in indirect communication with non-neighboring devices via one or more aggregate routes. As described above, an aggregate route may include one or more local links 104. For example, the first electronic device 902*a* may be in communication with the access point 906 via an aggregate route comprised of one or more local links. Each aggregate route may include links corresponding to directions of communication. For example, the first electronic device 902*a* may receive information from the access point 906 via an aggregate receive link that may be comprised of one or more local receive links 920*a-d*. Similarly, the first electronic device 902*a* may transmit information to the access point 906 via an aggregate transmit link that may be comprised of one or more local transmit links 922*a-d*. The other electronic devices 902*b-d* and the access point 906 may be connected in a similar fashion via one or more aggregate receive links and one or more aggregate transmit links. It should be noted that one or more of the links 920*a-d*, 922*a-d* may be wired or wireless links. For example, the electronic devices 902*a-d* and the access point 906 may exist on a wireless network and may pass information via wireless links.

The access point 906 may gather link quality information for the aggregate links. For example, the access point 906 may gather local receive link quality information from one or more electronic devices 902*a-d*. The access point 906 may also track the aggregate transmit link quality information.

Based on this information (i.e., the aggregate receive link quality information and the aggregate transmit link quality information), the access point 906 may determine which of the aggregate receive link and the aggregate transmit link has the lower link quality as described in connection with FIG. 8. The aggregate link with the lowest link quality may be termed the worst case link. As described above, the access point 906 may then direct an electronic device 902 to display the worst case link quality and may optionally send the worst case link quality information.

Figure 10:
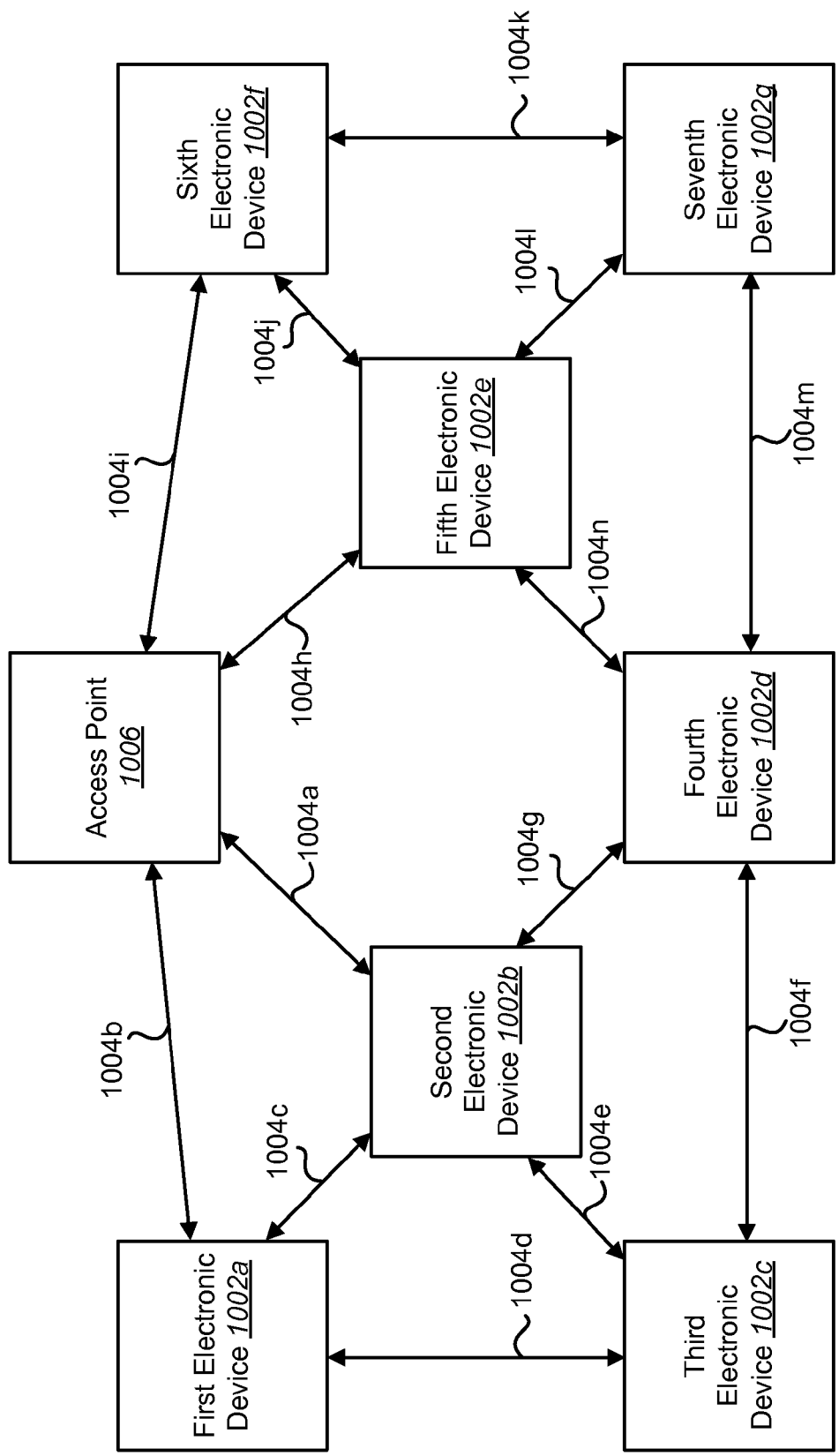
FIG. 10 is a block diagram illustrating another configuration of an access point and electronic devices in which systems and methods for indicating link quality may be implemented.

FIG. 10 is a block diagram illustrating another configuration of an access point 1006 and electronic devices 1002*a-g* in which systems and methods for indicating link quality may be implemented. The access point 1006 and electronic devices 1002*a-g* may be examples of the access point 106 and electronic devices 102*a-e* described in connection with FIG. 1. The electronic devices 1002*a-g* may communicate with neighboring devices via one or more local links 1004*a-n* that may be examples of the local links 104*a-h* described in connection with FIG. 1. As described above, one or more of the access point 1006 and the electronic devices 1002*a-g* may communicate with multiple other devices. In other words, the systems and methods described herein may be implemented in a mesh network.

FIG. 11 is an example of displaying a link quality status 1124 on an electronic device 102. As described above, the electronic device 102 may convert link quality information (quantitative data) into a link quality status 1124 (qualitative data). Similarly, as described above, an electronic device 102 may include a link quality indicator 110 that may implement various color indications 1126 to indicate the various link quality statuses 1124. FIG. 11 depicts various color indications 1126 that may be associated with various link quality statuses 1124. As depicted in FIG. 11, the different color indications 1126 may be represented by different cross-hatching and border types. For example, a green color indication 1126 (indicated as a solid circle with no cross-hatching) may correspond to a "good" link quality status 1124. Similarly, a yellow color indication 1126 (indicated as a dashed circle with no cross-hatching) may correspond to an "adequate" link quality status 1124. Similarly, a red color indication 1126 (indicated as a solid circle with cross-hatching) may correspond to a "risk/low" link quality status 1124.

The systems and methods described herein may be implemented in accordance with the ZigBee® communication protocol. Additionally, the systems and methods described herein may be implemented in accordance with Control4® system protocols.

Examples of electronic devices 102 may include electronic circuits, integrated circuits, circuits with discrete components (e.g., resistors, capacitors, transistors, etc.), devices with processors, computers, memory cells, latches, logic gates, etc. For instance, an electronic device 102 may include components and a microprocessor that may be used to track link quality information, receive a request to display link quality and display the link quality.

Figure 12:
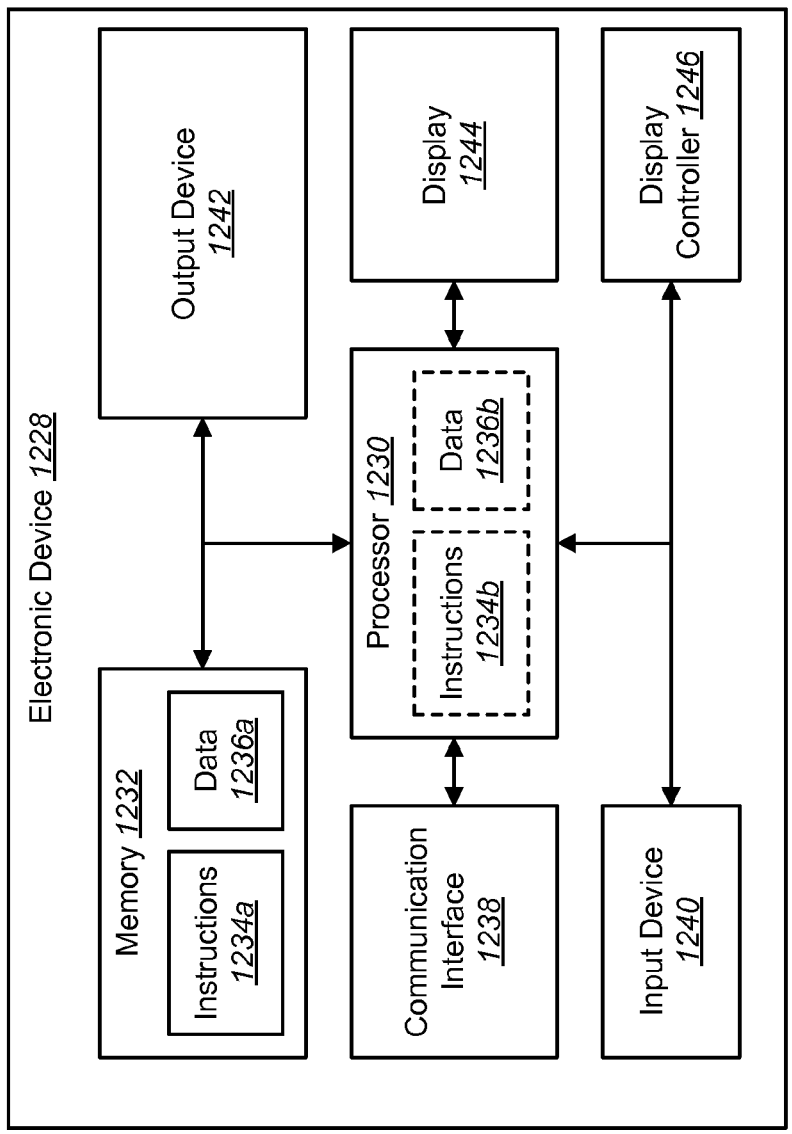
FIG. 12 is a block diagram illustrating various components that may be utilized in an electronic device.

FIG. 12 is a block diagram illustrating various components that may be utilized in an electronic device 1228. One or more of the electronic devices 102*a-e*, 402 and 902*a-d* and one or more of the access points 106, 506 and 906 described previously may be configured similarly to the electronic device 1228 illustrated in FIG. 12. For example, the electronic device 1228 may be configured to perform one or more of the methods 200, 300, 600, 700 and 800 described above. The electronic device 1228 may include a processor 1230 and memory 1232. The processor 1230 may control the operation of electronic device 1228 and may be embodied as a microprocessor, a microcontroller, a digital signal processor (DSP) or other device known in the art. The processor 1230 typically performs logical and arithmetic operations based on program instructions 1234*a* and/or data 1236*a* stored within the memory 1232. The instructions 1234*a* in the memory 1232 may be executable to implement the methods described herein. FIG. 12 illustrates instructions 1234*b* and/or data 1236*b* being loaded onto the processor 1230. The instructions 1234*b* and/or data 1236*b* may be the instructions 1234*a* and/or data 1236*a* (or portions thereof) stored in memory 1232.

The electronic device 1228 may also include one or more communication interfaces 1238 for communicating with other electronic devices. The communication interface(s) 1238 may be based on wired communication technology and/or wireless communication technology, such as Zig-Bee®, WiMax®, WiFi®, Bluetooth® and/or cellular protocols, such as GSM®, etc.

The electronic device 1228 may also include one or more input devices 1240 and one or more output devices 1242. The input devices 1240 and output devices 1242 may facilitate user input/user output. A specific example of an output device is a display 1244. A display controller 1246 may control the display 1244.

Instructions 1234*a* and data 1236*a* may be stored in the memory 1232. The processor 1230 may load and execute instructions 1234*b* from the instructions 1234*a* in memory 1232 to implement various functions. Executing the instructions 1234*a* may involve the use of the data 1236*a* that is stored in the memory 1232. The instructions 1234*b* and/or data 1236*b* may be loaded onto the processor 1230. The instructions 1234 are executable to implement the one or more methods described herein and the data 1236 may include one or more of the various pieces of data described herein.

The memory 1232 may be any electronic component capable of storing electronic information. The memory 1232 may be embodied as random access memory (RAM), read-only memory (ROM), magnetic disk storage media, optical storage media, flash memory devices in RAM (Random Access Memory), on-board memory included with the processor, EPROM (Erasable Programmable Read-Only Memory), EEPROM (Electrically Erasable Programmable Read-Only Memory), an ASIC (Application Specific Integrated Circuit), registers and so forth, including combinations thereof.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

As used herein, the term "coupled" and other variations thereof may mean that one element is connected to another element directly or indirectly. For example, if a first element is coupled to a second element, the first element may be connected directly to the second element or may be connected to the second element through another element.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be tangible and non-transitory. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for indicating link quality by a controlled electronic device, comprising:
    tracking local link quality information corresponding to a local receive link between the controlled electronic device and a neighboring device;
    receiving, from a home controller that directs the controlled electronic device to supply or remove power from a load, a request to indicate a worst link quality at the controlled electronic device, wherein the worst link quality is a lowest link quality among an aggregate receive link between at least one controlled electronic device and the home controller and an aggregate transmit link between the at least one controlled electronic device and the home controller, wherein each of the aggregate receive link and the aggregate transmit link comprises multiple local links; and
    indicating the worst link quality.

2. The method of claim 1, wherein the local receive link comprises a ZigBee communication link.

3. The method of claim 1, wherein the link quality comprises local link quality.

4. The method of claim 1, further comprising converting the link quality information into a link quality status.

5. The method of claim 4, wherein the link quality status is displayed via a display interface with a color indication corresponding to the link quality status.

6. The method of claim 1, wherein the neighboring device comprises the home controller.

7. The method of claim 1, wherein the neighboring device comprises another electronic device between the controlled electronic device and the home controller.

8. The method of claim 1, wherein the link quality information comprises at least one of a received signal strength indicator (RSSI), a link quality indicator (LQI), a noise floor and a signal to noise ratio (SNR).

9. The method of claim 1, further comprising updating the link quality information in real time.

10. A method for indicating link quality by a home controller, comprising:

gathering receive link quality information for at least one controlled electronic device;
determining transmit link quality for at least one controlled electronic device based on the gathered receive link quality information;
determining which of an aggregate receive link and an aggregate transmit link has a worst link quality, and wherein the worst link quality is a lower of aggregate receive link quality and aggregate transmit link quality, wherein each of the aggregate receive link and the aggregate transmit link comprises multiple local links; and
directing, by the home controller that directs the controlled electronic device to supply or remove power from a load, the controlled electronic device to indicate a link quality.

11. The method of claim 10, wherein at least one of a receive link and a transmit link comprise wireless links.

12. The method of claim 10, wherein the link quality comprises local link quality based on a local receive link between the controlled electronic device and a neighboring device.

13. The method of claim 10, wherein the link quality information comprises at least one of a received signal strength indicator (RSSI), a link quality indicator (LQI), a noise floor and a signal to noise ratio (SNR).

14. The method of claim 10, wherein a link quality status is displayed via a display interface with a color indication corresponding to the link quality status.

15. A controlled electronic device for indicating link quality, comprising:
a processor;
memory in electronic communication with the processor; and
instructions stored in the memory, the instructions being executable to:
track local link quality information corresponding to a local receive link between the controlled electronic device and a neighboring device;
receive, from a home controller that directs the controlled electronic device to supply or remove power from a load, a request to indicate a worst link quality at the controlled electronic device, wherein the worst link quality is a lowest link quality among an aggregate receive link between at least one controlled electronic device and the home controller and an aggregate transmit link between the at least one controlled electronic device and the home controller, wherein each of the aggregate receive link and the aggregate transmit link comprises multiple local links; and
indicate the link quality.

16. The controlled electronic device of claim 15, wherein the local receive link comprises a wireless link.

17. The controlled electronic device of claim 15, wherein the link quality comprises local link quality.

18. The method of claim 1, further comprising:
receiving a round robin ping from the home controller;
enter a mode of operation where signal strength indicators are displayed based on the round robin ping from the home controller.

* * * * *